J. J. WHITE.
Coal-Scuttles.

No. 143,208.　　　　　　　　　Patented September 23, 1873.

Witnesses.　　　　　　　　　Inventor
　　　　　　　　　　　　　　J. J. White
　　　　　　　　　　　　　by his Attys.

UNITED STATES PATENT OFFICE.

JOHN J. WHITE, OF NORFOLK, VIRGINIA.

IMPROVEMENT IN COAL-SCUTTLES.

Specification forming part of Letters Patent No. 143,208, dated September 23, 1873; application filed April 28, 1873.

*To all whom it may concern:*

Be it known that I, JOHN J. WHITE, of Norfolk city and county, and State of Virginia, have invented an Improved Coal-Scuttle and Ash-Pan; and I do hereby declare the following to be a full and exact description of the same, reference being had to the accompanying drawings forming part of this specification, in which—

Figure 1:
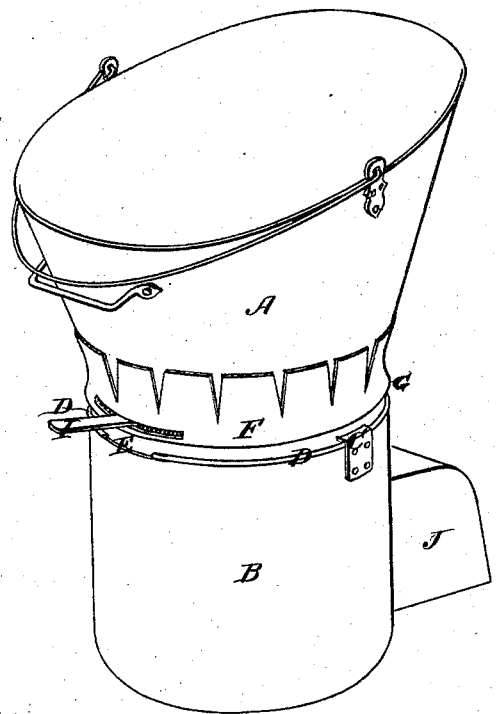
Figure 2:
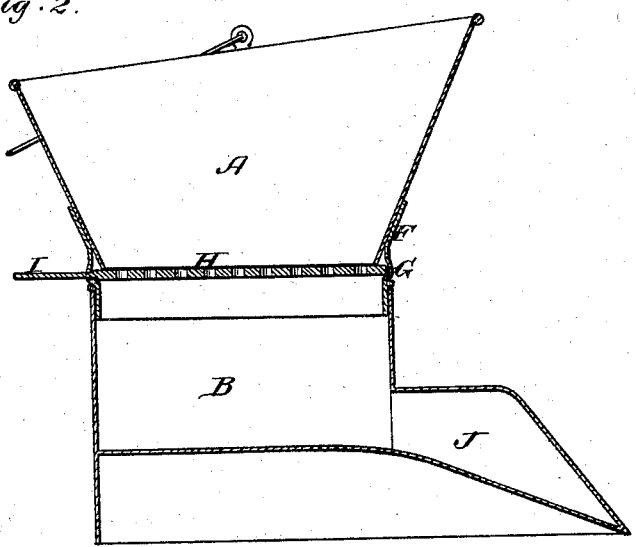

Figure 1 is a perspective view, and Fig. 2 a sectional elevation.

Similar letters of reference in the accompanying drawings denote the same parts.

This invention relates to that class of coal-scuttles which are provided with a perforated or grated bottom for sifting and a detachable pan for the ashes; and it consists, first, in the peculiar construction of the scuttle, the same affording a method of securing the reciprocating perforated bottom or grate in place; and, secondly, in the peculiar shape of the ash-pan, whereby the cinders are enabled to be poured back into the stove after sifting without removing the pan or scattering the ashes, as I will now proceed to describe.

In the drawings, A represents the body of the coal-scuttle, and B the ash-pan, the two being fitted together and connected by ears C on the latter embracing flanges D D on the lower edge of the former. Spaces E between said flanges afford means for detaching the pan when desired. To the lower edge of the scuttle is riveted or otherwise attached a ring or section, F, the upper part of which is notched to allow it to conform to the shape of the scuttle, while its lower end is turned upward and provided with a groove, G, on which the reciprocating perforated bottom or grate H rests. The lower edge of the body A of the scuttle projects nearly down to the bottom H, and is of less diameter than the latter; consequently it acts in connection with the groove G to hold the bottom in place. I represents a handle projecting from the bottom H through a slot in the groove G, by means of which handle the bottom is shaken in the usual manner. The ash-pan B has a chamber, J, opening into it on its front side. The chamber has an inclined bottom, and is of about the same width as the diameter of the ash-pan.

In operating the device, the cinders and ashes are placed in the scuttle and sifted in the usual manner, the ashes falling into the pan B. After sifting, the partially-consumed cinders are poured back into the stove, the forward part of the scuttle, with the chamber J of the ash-pan, being depressed in so doing. This motion causes the ashes to flow downward into the chamber J, and consequently prevents their accumulating in the pan itself in such quantity as to escape through the perforated bottom when the scuttle is inclined; hence it is unnecessary to remove the ash-pan from the scuttle after every sifting. By this arrangement comparatively little dust is allowed to escape.

I claim as my invention—

1. The grooved rim F, entirely surrounding the lower part of the coal-scuttle, in combination with the perforated bottom H and coal-scuttle A, when the lower edge of the latter projects nearly down to said bottom H and within the rim to confine the bottom in the groove, as and for the purpose set forth.

2. The ash-pan B, having the peculiarly-shaped chamber J on its front side, for the purpose of receiving the ashes when the scuttle is inclined, substantially as described.

JNO. J. WHITE.

Witnesses:
   C. N. MUNDEN,
   G. B. WILEY.